United States Patent [19]

Huffman et al.

[11] 3,794,832
[45] Feb. 26, 1974

[54] BI-DIRECTIONAL CODED TRACK CIRCUITS WITHOUT INSULATED JOINTS

[75] Inventors: Donald D. Huffman, Penn Hills Township, Allegheny County; Andrew J. Carey, West Mifflin, both of Pa.

[73] Assignee: Westinghouse Air Brake Company, Swissvale, Pa.

[22] Filed: Nov. 21, 1972

[21] Appl. No.: 308,495

[52] U.S. Cl................ 246/33 R, 246/40, 178/71 G
[51] Int. Cl............................................. B611 23/30
[58] Field of Search...... 246/33 R, 34 R, 34 CT, 36, 246/40; 178/71 R, 71 G; 325/5

[56] References Cited
UNITED STATES PATENTS

| 2,558,473 | 6/1951 | Young | 246/33 |
| 3,079,495 | 2/1963 | Ferm et al. | 245/33 |

*Primary Examiner*—Robert J. Spar
*Assistant Examiner*—George H. Libman
*Attorney, Agent, or Firm*—H. A. Williamson; A. G. Williamson, Jr.

[57] ABSTRACT

At each end of a track stretch, a relay chain driven by a code transmitter at times connects across the rails in repeated sequences a polar, code following track relay, a track battery, and a rail shunt path. A similar sequence of rail connections at each intermediate repeater location is produced by a front contact repeater and a decoding repeater of the corresponding track relay. Each repeater relay has a selected slow release to produce the sequence following each response by the track relay to a received energy pulse. The pulse following operation of each end location track relay is decoded by a repeater relay which connects the track relay continuously across the rails and inhibits relay chain operation. A shorter relay chain at one end prevents scrambled code and provides a dominant pulse transmitter with no train occupancy and no entering signal cleared. Each repeater location transmits in either direction and requires no insulated joints to separate adjoining sections since track battery connections are of alternately opposite polarity from location to location. The track rail shunt applied following pulse transmission at each location prevents response by the associated track relay to the subsequent pulse transmitted from the adjacent advance location and thus maintains pulse direction. To prevent false operation, each track relay is rail connected with polarity opposite to the same location track battery. Clearing an entering signal sets up pulse transmission from the other end.

13 Claims, 2 Drawing Figures

BI-DIRECTIONAL CODED TRACK CIRCUITS WITHOUT INSULATED JOINTS

BACKGROUND OF THE INVENTION

Our invention pertains to bi-directional coded track circuits. More particularly, this invention relates to such track circuits for use in relatively long stretches of railroad track without requiring any insulated joints between the ends of a signal block.

There are many stretches of single track railroad where a signaling system to control the movement of trains would provide an operating advantage but where the amount of traffic, i.e., the number of trains per day, does not warrant the cost of conventional signaling or centralized traffic control systems. On such stretches of track even the installation of the so-called light traffic, controlled signaling system without following moves is not warranted if the length of the single track stretches between stations will require several conventional track circuits to provide continuous train detection with each track circuit electrically separated from the adjacent track circuits by insulated joints. Such insulated joints are expensive to install and their maintenance, to assure continued isolation of the adjacent track circuits, adds extra expense to the cost of the system operation. Further, if welded rail is in use in a stretch of railroad, the use of insulated joints may defeat at least some of the advantages of continuous rail. Such conventional track circuits also, in order to provide reversible characteristics, require two sources of track circuit energy for each track section and at each cut section location, that is, repeater location. What is needed is a track circuit which will include the entire length of the signal block between stations or passing sidings with only simple repeater locations which function without insulated joints.

Accordingly, an object of our invention is a bidirectional coded track circuit for use in relatively long stretches of single track without requiring insulated joints except at the ends of each signal block.

Another object of the invention is a coded direct current track circuit for a long stretch of single track railroad to provide train detection between the ends of the single track block without requiring insulated joints to divide the rails into track sections.

A further object of the invention is a track circuit arrangement to detect trains within a single track stretch between passing sidings without requiring insulated joints to divide the stretch into several separate track circuits.

Yet another object of our invention is a bidirectional jointless track circuit arrangement for use in a long stretch of single track railroad to detect the occupancy of that stretch by a train and to control the entering signals for either direction of traffic.

A still further object of our invention is a track circuit arrangement, to control and detect trains moving in either direction along a stretch of single track railroad, which includes energy transmitting and receiving means coupled to the rails at each end of that stretch and a selected number of energy repeater locations intermediate the end locations which are connected to the rails without insulated joints.

Also an object of our invention is a bi-directional, direct current coded track circuit arrangement which may incorporate a selected number of intermediate repeater locations connected to the rails without insulated joints in order that a single track circuit will detect the occupancy condition of a relatively long stretch of single track and also control the entering signals authorizing trains to enter either end of the stretch of track.

Other objects, features, and advantages of our invention will become apparent from the following specification when taken in connection with the accompanying drawings and appended claims.

SUMMARY OF THE INVENTION

In practicing our invention, a stretch of single track railroad extending between stations is isolated at each end from the rails in each adjacent station area, normally a main and passing track arrangement, by a set of insulated joints. A wayside signal is positioned at each end to authorize the movement of a train from each station area into the single track stretch. Although the arrangement of our invention may also be applied to the track stretches within the stations or passing track areas, the illustration herein is of the longer stretch of single track between such stations in order that all of the features embodied in our invention may be shown and described. A direct current energy transmitting means and a receiving means is connected to the rails at each end of this stretch. As specifically shown, each receiver means includes a direct current track relay of the polarized code following type which is at times connected to the rails to receive pulses of energy flowing in the rails from another transmitting location. Each track relay controls a repeater or decoding relay by a well-known capacitor decoding circuit arrangement. Thus, any periodic code following operation of the track relay, or the absence thereof, is recorded by its repeater or decoder in order to register the occupancy condition of the stretch, the code following operation indicating that the stretch is unoccupied.

Each transmitting means includes a chain of counting relays driven by a code transmitter at a preselected code rate. These chain relays respond, in a predetermined sequence, to the code pulses provided by the coding unit to establish a sequence of track connections. One period or connection applies energy to the rails from a direct current source shown as a track battery. During the subsequent period, a shunt is connected across the rails of the section, while finally the track relay is connected across the rails. The sequence of rail connection conditions is then repeated by the chain relays. A different number of chain relays is used at each end of the stretch of track in order to eliminate scrambled coding if both transmitters supply initial pulses of energy simultaneously to the rails after a train movement. Under these conditions, the transmitting means having the shorter counting chain dominates and will lock out the other transmitting means. This domination operation occurs because reception of an energy pulse through the rails by a track relay and the registry of that pulse by its decoding repeater interrupts the counting chain relay action at that point. Thus, the end with the shorter counting chain, by transmitting more frequency pulses, is able to interrupt the transmission of energy pulses at the other end. The registration of every remote request to clear the entry signal at a particular end of the stretch connects the associated track relay across the rails and interrupts pulse transmission from that location when the approach stick relay corresponding to that signal releases. Since either counting chain is always ready for operation if the associated track relay and its decoder repeater remain released, the registry of the signal request at one end immediately starts transmission of pulses from the other end of the stretch if this other transmitter is not already active.

In order to accommodate a long stretch of track, repeater apparatus is connected to the rails at selected intermediate locations but without inserting insulated joints into the rails. A receiver means, shown as a track relay, is normally connected across the rails at each repeater location. This track relay drives a direct front contact repeater which is energized during reception of each pulse by the track relay. The front contact repeater relay is provided with slow release characteristics but is not a decoding relay since it does release during each pulse reception cycle. A second repeater relay detects the code following operation of the track relay providing the front contact repeater is already picked up. This second repeater relay is controlled by a conventional capacitor decoding circuit arrangement and is provided with slow release characteristics but only of sufficient length to hold longer than the front repeater yet still release prior to the reception of the next code pulse. The two track relay repeaters form a transmitting means together with a direct current source shown as a track battery. These two relays operate through a cycle to provide a sequence of rail connections during the first period of which the track relay is connected across the rails when both repeater relays are released. This is followed by an energy transmission period with both repeater relays picked up to connect the track battery across the rails. A final period during the sequential release of the two repeater relays connects a shunt across the rails. Thus, the transmitting means at each repeater location operates to provide a sequence of rail connection conditions similar to that provided at each end location. Normally, if not operating, the track relay is connected continuously across the rails with both repeater relays released. The polarity connections of the battery and relay connections at each location are so arranged that a track relay will respond only to pulses transmitted from an adjacent location and not to pulses transmitted by its own associated transmitting means. This avoids any incorrect response of a track relay to pulses transmitted at the same location if some circuit fault occurs. In addition, to provide separation of the stretch, the direct current track energy sources at the successive locations through the stretch, end and repeater, are connected to the rails with alternatively opposite polarity so that, while the associated track relay will not respond to local pulses, the track relays at adjacent locations are properly connected to respond to such selective polarity pulses.

Summarizing, at a particular repeater location, when that track relay responds to a pulse of energy received from an adjacent location, the repeater relays are operated so that that location subsequently transmits a pulse of energy into the rails. The transmitter relays then sequentially release to provide a shunt across the rails so that their associated track relay cannot respond to a similar energy pulse transmitted from the adjacent location in the direction of code transmission. Then the track relay is again connected to the rails to receive the next pulse of energy from the other adjacent location as the coding operation continues. In this manner a pulse of energy transmitted into the rails at one end location is repeated or retransmitted from each repeater location intermediate the ends through the rails so that it is eventually received by the track relay at the other end. The presence of a train within the stretch shunts these energy pulses so that there is no reception at the other end of the stretch. This absence or nonreception of the pulses at an established receiver end, so that the decoding or track repeater relay remains released, is registered as a track stretch occupied condition.

DETAILED DESCRIPTION OF THE ILLUSTRATED EMBODIMENT

We shall now describe in greater detail the illustrated embodiment of our invention and will then point out the novel features thereof in the appended claims. During the following description, reference will be made from time to time to the accompanying drawings in which:

Across the top of the drawings, a stretch of single track railroad is shown by a conventional two-line representation. The stretch involved extends from the insulated joints J, shown in the rails at the upper left of FIG. 1A, to the similar set of insulated joints J shown at the upper right of FIG. 1B. However, there are no other insulated joints between these two specific locations so that each rail is electrically continuous. Entry signals to control or authorize train movements into the stretch are located at each set of insulated joints, the signal RG controlling train movements into the stretch to the right and the opposing signal LG controlling train movements into the stretch to the left. Beyond each set of insulated joints, that is, off the illustrated drawings, may be a station area with a passing siding or some type of interlocking. Exit signals would normally be provided to authorize the movement of trains from the illustrated stretch into the station areas in order to complete the signal system, but these are not shown since they are not necessary for an understanding of our invention. It is to be noted that each illustrated signal is shown by a conventional symbol as a two-position signal providing only a stop and a clear indication to trains. In other words, no following movements are intended through the stretch behind an autohrized train movement but approach signals for each exit signal may be added and controlled by some form of overlay track circuits. Again, these approach signals and their controlling track circuits are not illustrated since they do not form part of our invention.

Figure 1A:
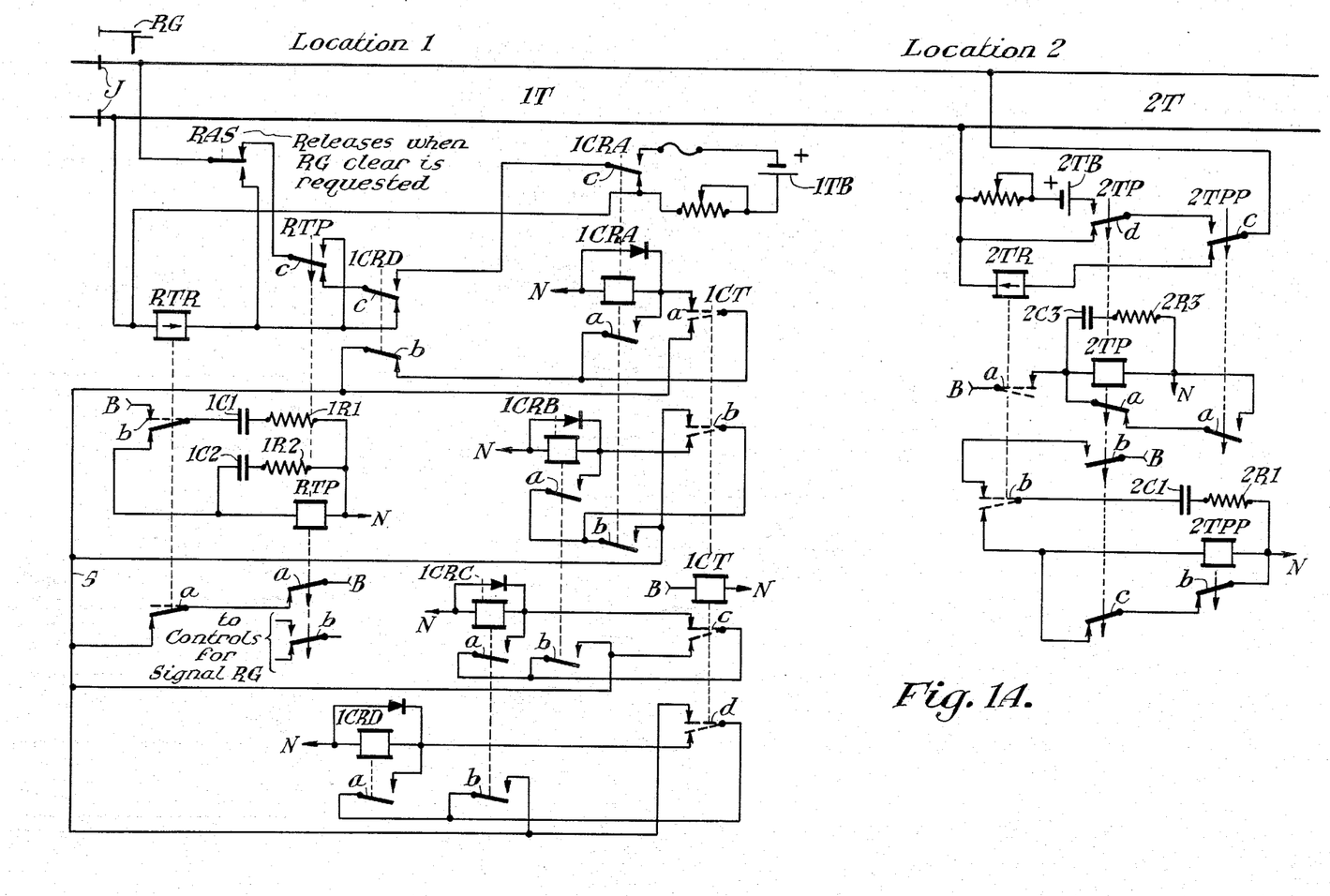
FIGS. 1A and 1B, when placed side by side with FIG. 1A to the left, illustrate in circuit diagram form a track circuit arrangement for a stretch of single track railroad which embodies the features of our invention. In each of the drawings, similar reference characters designate similar parts or elements of the apparatus.
Figure 1B:
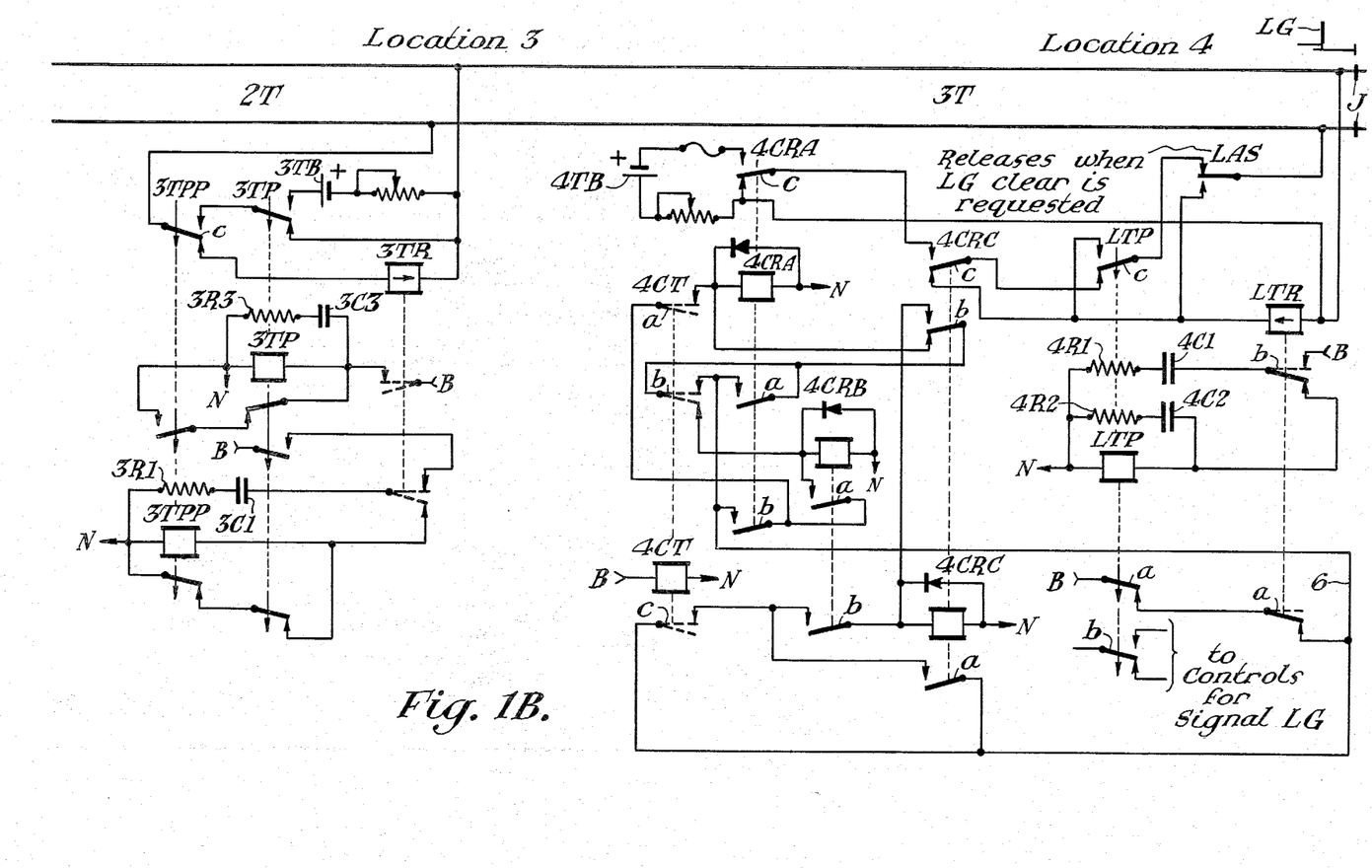

The apparatus for the track circuit arrangement is divided between four locations which are designated across the top of the drawings. Briefly, location 1 includes the apparatus associated with the left end location of the track stretch, locations 2 and 3 are intermediate repeater locations, while location 4 is at the right end of the stretch. The track sections between these locations are designated from the left as sections 1T, 2T, and 3T, respectively. It is to be understood that the number of repeater locations and thus the number of track sections depends upon the length of the overall stretch and the transmission characteristics of the rails. Conventionally, and in one representative installation, each section of track is on the order of 10,000 feet in length.

Each location is provided with a local source of direct current energy, separate from the source for the track circuit, for the operation of relays and similar apparatus. These specific sources are not shown since the use of any one of several known types is conventional in the art. Only the positive and negative terminals of the d.c. sources, designated by the references B and N, respectively, are indicated and the use of these references denotes, in each case, a connection to the corresponding terminal of the source. The track relays, designated by the general reference TR, are of the polar, code following type and therefore will respond only to current flowing in the proper direction through the relay winding, as designated by the arrow shown within the winding symbol. Certain of the relays are provided with slow release periods, in each case by adding a capacitor-resistor snub connected in multiple with the relay winding. Such relays are designated by a downward pointing arrow drawn through the contact armatures, that is, the movable portion of each contact of that relay. It is to be noted that all relay contact armatures, whether shown above or below their winding symbol, move up to close front contacts when the relay winding is energized. Conversely, such armatures thus move down to close back contacts when the relay winding is deenergized or at the end of the slow release period if such is pertinent to the relay.

Each end location 1 and 4 includes a track energy transmitting means and receiving means. The transmitting means comprises a chain of counting relays (CR) and a pulsing means shown as a conventional code transmitter device (CT). Each receiving means includes a track relay (TR) and a track repeater or decoding relay designated by the reference TP, which, in addition to detecting the code following operation of the track relay, records or registers the occupancy condition of the stretch of track. By way of specific example, at location 1 are illustrated the counting chain relays 1CRA, 1CRB, 1CRC, and 1CRD. The pulse means is the code transmitter device or relay 1CT. The winding of this latter unit is shown as permanently connected between terminals B and N of the local source so that the code transmitter is continuously operating and, as well known in the art, thus alternately and at a selected periodic rate closes its front and back contacts. For this reason, the contact armatures of transmitter 1CT and the corresponding transmitter at the other end location are shown by dotted symbols in each position since they continually operate between the two positions at the selected code rate which, as a specific example, may be on the order of 75 times per minute. At location 1 are track relay RTR and its repeater relay RTP. As previously indicated, relay RTR is of the polar, code following type so that it is properly energized to pick up its contacts only when current flows through the relay winding in the direction of the arrow, shown as being from left to right. Since relay RTR at times follows code pulses received through the rails, its contact armatures are shown by a solid line in the released position, which it would normally occupy, and by a dotted symbol in the energized or picked-up position to indicate that at times a code following operation of these contacts occurs.

Describing first the operation of the counting chain at location 1, it is assumed that relays CR are initially inactive and released and are now actuated into their sequence by the release of relays RTR and RTP in a manner to be later described. It is to be noted that each counting chain relay winding is snubbed by a diode for purposes of slightly retarding the relay release in order to allow stick circuits to become effective at the end of the transfer time of the contacts of transmitter 1CT. When back contacts a of relays RTP and RTR close, they complete a connection from terminal B of the local source to a bus connection 5 and thence over back contact b of relay 1CRD, front contact a of transmitter 1CT when next closed, and through the winding of relay 1CRA to terminal N. Thus energized, relay 1CRA picks up, closing its front contact a to complete a first stick circuit over back contact b of relay 1CRD to bus 5. It will be noted that, for the operation of the counting chain to continue, bus lead 5 must remain energized from terminal B over the previously mentioned back contacts a of relays RTR and RTP and this connection will be assumed during the following discussion.

When transmitter 1CT closes its back contacts as its periodic coding operation continues, a second stick circuit for relay 1CRA is completed over back contact a of the transmitter and front contact a of relay 1CRA. Since front contact b of relay 1CRA is now closed, a connection from bus lead 5 is also completed over back contact b of transmitter 1CT to the winding of relay 1CRB, and this relay is energized and picks up. When relay 1CRB closes its front contact a, it completes one stick circuit for itself including front contact b of relay 1CRA. When transmitter 1CT again picks up its contacts, the closing of its front contact c completes a circuit from lead 5 over front contact b of relay 1CRB, now closed, to the winding of relay 1CRC, which is thus energized and picks up. The closing of front contact a of this latter relay completes its first stick circuit, further including front contact b of relay 1CRB. When transmitter 1CT again releases its contacts, a circuit is completed for energizing relay 1CRD which includes front contact b of relay 1CRC and back contact d of transmitter 1CT. Relay 1CRD picks up, closing its front contact a to complete its first stick circuit including front contact b of relay 1CRC.

The opening of back contact b of relay 1CRD interrupts the first stick circuit for relay 1CRA but this relay remains energized for the present over its second stick circuit including back contact a of transmitter 1CT. When the code transmitter again picks up, the opening of its back contact a interrupts this remaining stick circuit for relay 1CRA which then releases. This opens front contact b of this latter relay and transfers the stick circuit for relay 1CRB to front contact b of transmitter 1CT. During the next transfer of contacts of transmitter 1CT, relay 1CRB is deenergized and releases when front contact b of the transmitter opens. The opening of front contact b of relay 1CRB transfers the stick circuit for relay 1CRC to back contact c of transmitter 1CT. When back contacts of transmitter 1CT next open, relay 1CRC is deenergized and releases, opening its front contact b to transfer the stick circuit for relay 1CRD to front contact d of transmitter 1CT. This last chain relay is then deenergized when front contact d of relay 1CT releases during the next half cycle of the code and relay 1CRD releases. During the subsequent half cycle of the coding action of transmitter 1CT, all counting chain relays remain released and then the sequence is reinitiated by the closing of front contact *a* of transmitter 1CT which, together with now closed back contact *b* of relay 1CRD, completes a path from lead 5 to the winding of relay 1CRA. Briefly summarizing, the chain relays thus pick up in sequence during three half cycles of the code developed by transmitter 1CT as it periodically picks up and releases its contacts. During the fourth half cycle of this period, all counting chain relays are simultaneously energized and have their front contacts closed. Subsequently, during the next three half cycles the relays release in order and, during the last half cycle at the end of a four cycle period, all counting chain relays are released. Following this, the sequence of pickup and release of the counting chain relays repeats.

Turning now to the control of decoding relay RTP to repeat the operation of relay RTR, when it is following code pulses from the rails, it is apparent that relay RTP is controlled by a well-known capacitor decoding arrangement. Briefly, each time front contact *b* of relay RTR closes as a pulse of energy is received from the rails, capacitor 1C1, in series with resistor 1R1, is connected between terminals B and N of the local source and becomes charged. When the track code pulse ends, relay RTR releases, closing its back contact *b* to complete a loop circuit by which capacitor 1C1 is discharged through the winding of relay RTP, thus energizing the relay which picks up. Capacitor 1C2 and resistor 1R2, connected in series across the relay winding, provide a slow release snub which retards the release of relay RTP so that it will hold its front contacts closed for a period sufficient to bridge the open circuit time of back contact *b* of relay RTR as this latter relay is following track code pulses. It will be understood that other forms of decoding, e.g., front and back contact repeaters, may be used although one or more additional relays will be required.

It may be noted that contact *b* of relay RTP provides a control for signal RG. When back contact *b* is closed, a red or stop indication is actuated on signal RG regardless of any other controls which may have been exercised. Front contact *b* of relay RTP prepares a circuit which will enable signal RG to be cleared for a train movement from left to right through the stretch when such is desired and requested from a remote control location. In other words, it is assumed that the signal is cleared only upon request by a remote operator who transmits a control to this location setting up the clear signal indication. When this occurs, a normally energized approach lock stick relay RAS, which is illustrated by only one set of transfer contacts, is released to close its back contacts. When this occurs, the closing of the illustrated back contact of relay RAS completes a direct connection across the rails for relay RTR which bypasses all other contacts, of the track repeater and chain relays, in the circuit network which will be shortly defined. Under normal conditions with no clear signal requested, the front contact of relay RAS is closed to connect the normal track energy transmitting and receiving network to the rails.

In the track circuit network at this location, the basic circuit path for connecting relay RTR across the rails includes back contacts *c* of relays RTP and 1CRD, as well as the discussed front contact of relay RAS. If relay RTR follows code pulses so that relay RTP is energized and picks up, the closing of front contact *c* of this latter relay completes an abbreviated circuit path which connects the winding of relay RTR across the rails without regard to positions of the counting chain relays. The conditions under which the circuit over the back contact of relay RAS is completed have been described above. It will be noted that, in each of these circuit paths, current must flow from the bottom rail through the relay winding and back to the upper rail, as shown in the drawing, in order for relay RTR to respond to the track energy.

Energy for the track circuit when transmitting a pulse from this location is provided by a track battery 1TB illustrated in the drawing. The battery is connected across the rails to actuate the transmission of an energy pulse from this location when the circuit traced from the positive terminal of battery 1TB and through a fuse is completed over front contacts *c* of relays 1CRA and 1CRD, thence over back contact *c* of relay RTP and the front contact of relay RAS to the upper rail. The return path from the lower rail is direct to the negative terminal of the battery except for including an adjustable resistor for limiting the track current flowing in section 1T. Each track battery, 1TB and others, in a manner well known in the art, may of course be connected across a rectifier supplied from a local commercial alternating current source in order to maintain a floating charge on the battery of sufficient voltage for the track circuit. Since the track energy requirements are low, because of the slow rate of the code pulses, the track batteries, especially at the repeater locations, may be of the primary type. During the sequential operation of the counting chain, when relay 1CRA has released to close its back contact *c*, but relay 1CRD is yet energized to hold its front contact *c* closed, a direct shunt circuit path is connected across the rails over these two contacts and over the previously mentioned back contact *c* of relay RTP and front contact of relay RAS. Reviewing from the description of the counting chain relay sequential operation, the circuit paths in the track circuit network are completed in the order of a period connecting relay RTR across the rails, a period when battery 1TB is connected to supply a pulse of energy, and a third period in which a shunt connection is placed across the rails. Following this shunt connection, the sequential operation is repeated.

Similar circuits and apparatus are provided at location 4 at the right end of the track stretch. Only three counting chain relays 4CRA, 4CRB, and 4CRC are used, together with an associated code transmitter 4CT. Also provided is a track relay LTR and its repeater relay LTP, together with an approach stick relay LAS, associated with the signal control circuits, of which only a set of transfer contacts is shown whose operation is defined by the note on the drawing. The operation of relay LTR and its repeater LTP at this location is identical with that described for the corresponding relays at the other end and need not be here repeated. With only three counting chain relays, a code transmitter having the same rate as that at the other end, and a circuit network as shown, the cycle of operation is only 75 percent the length of the corresponding cycle at location 1. This shorter cycle is provided in order to eliminate continued pulse or code scramble conditions when the track circuit is resetting after the passage of a train. Location 4 becomes the dominant location and transmits during the normal at-rest conditions in the track circuit, that is, when no train is moving through the stretch.

Referring to FIG. 1B, it is apparent that counting chain action can occur only when relays TRL and LTP when released so that the series circuit from terminal B over back contacts *a* of these relays remains closed to supply energy to bus lead 6 and thus to the counting chain. The energizing circuit for relay 4CRA includes back contact *b* of relay 4CRC and front contact *b* of transmitter 4CT. When relay 4CRA picks up, the closing of its front contact *a* completes a first stick circuit bypassing front contact *b* of transmitter 4CT. With front contact *a* of relay 4CRA closed, the closing of back contact *b* of transmitter 4CT energizes relay 4CRB. The closing of its front contact *a* completes a stick circuit including front contact *b* of relay 4CRA to hold relay 4CRB when transmitter 4CT opens its back contacts during the next half cycle of its periodic coding operation. Relay 4CRC is energized during this next half cycle over the circuit including front contact *b* of relay 4CRB and front contact *c* of transmitter 4CT. Although back contact *b* of relay 4CRC now opens, relay 4CRA is held energized for this half cycle by a second stick circuit over its own front contact *b* and front contact *a* of transmitter 4CT.

When code transmitter front contacts next open, relay 4CA is deenergized and releases to open both front contacts. However, relay 4CRB is held energized by a second stick circuit including its own front contact *b*, front contacts *a* and *b* of relay 4CRC, and back contact *b* of transmitter 4CT. During the next half cycle, relay 4CRB releases but relay 4CRC holds over its own front contact *b* and front contact *b* of transmitter 4CT. Relay 4CRC releases during the sixth half cycle of code and then the chain sequence repeats. In summary, the three chain relays pick up in sequence during the first two half cycles of code, i.e., transmitter 4CT pickup and release. The three relays hold during the next half cycle and then release in sequence. All relays remain released during the final half cycle of the three code pulse cycle of operations.

Considering the track circuit network at location 4, it is obvious that the alternate circuit paths for connecting relay LTR directly across the rails, for code reception only, include first, the back contact of relay LAS or, second, the front contact of relay LAS and front contact *c* of relay LTP. Completion of either of these circuit paths completely eliminates the transmission of track energy pulses to the rails at this location and they are thus identical in operation and purpose with the similar circuit paths at the other end. The basic circuit path by which relay LTR will normally be connected across the rails includes the front contact of relay LAS, back contact *c* of relay LTP and, at this location, back contact *c* of relay 4CRC. It is to be noted that the incoming track pulses must have a positive polarity on the upper rail, as shown, since proper current flow through the winding of relay LTR requires that the current flow from the upper rail through the circuit path and back to the lower rail. A track battery 4TB at this location is connected across the rails at the proper time in the counting chain sequence from its positive terminal over front contacts *c* of relays 4CRA and 4CRC, back contact *c* of relay LTP, and front contact of relay LAS to the lower rail, returning by direct connection from the upper rail through the adjustable track resistor to the negative terminal of the track battery. With the positive terminal of battery 4TB thus connected to the lower rail, any circuit network or relay contact fault will not result in the improper pickup of relay LTR. The rail shunt connection includes, at the critical point, front contact *c* of relay 4CRC and back contact *c* of relay 4CRA which, for a period during the counting chain cycle, complete the shunt path across the rails at this location.

Thus, at this location also, as a result of the sequential operation of the counting chain, the track circuit network paths are completed in the order of the receiving period in which the track relay is connected across the rails, the transmitting period connecting battery 4TB across the rails, and a subsequent rail shunt period, after which the sequence repeats. The length of the period in which the track battery TB is connected across the rails to transmit an energy pulse is of equal length at each end of the circuit. Therefore, track circuit energy pulses regardless of their source are of equal length but, as previously explained, will occur at different frequencies from each end of the track stretch. The period during which track relay LTR is connected across the rails and the subsequent shunting period of the rails are both shorter at location 4 than at location 1.

Each repeater location also includes a receiving means and a track energy transmitting means but operation occurs only when energy pulses are being transmitted from an end location. Since the apparatus at each repeater location is identical, the description of that at a single location will be sufficient. Referring to location 2, the receiver means comprises only the track relay 2TR, which is also of the polar, code following direct current type. Since it is normally following code or track energy pulses, excpet when a train is actually passing the location, the contacts of relay 2TR are shown dotted in each position to signify its normal code following operation. The transmitting means includes two track repeater relays 2TP and 2TPP. Relay 2TP is a front contact repeater of the associated track relay 2TR while relay 2TPP detects the code following operation of relay 2TR.

Considering the repeaters, relay 2TP is energized, each time relay 2TR picks up, by a simple circuit including front contact *a* of relay 2TR. Slow release characteristics are provided for relay 2TP by connecting capacitor 2C3 and resistor 2R3 in series across the winding of the relay. The direct shunt on the relay winding, including back contact *a* of relay 2TP and front contact *a* of relay 2TPP, assures the complete discharge of capacitor 2C3 at the end of each received code pulse cycle. Relay 2TPP is controlled by the well-known capacitor decoding method and detects the code following operation of relay 2TR but only if relay 2TP is picked up. Tracing the circuit, when front contact *b* of relay 2TP is closed, connection is made from terminal B of the source over front contact *b* of relay 2TR and through capacitor 2C1 and resistor 2R1 to terminal N so that this capacitor is charged during the reception of a code pulse from the rails by relay 2TR. When the code pulse reception ceases and back contact *b* of relay 2TR closes, capacitor 2C1 is discharged in the loop circuit including the winding of relay 2TPP so that this latter relay is energized and picks up at this time. The direct shunt across the relay winding including back contact *c* of relay 2TR and back contact *b* of relay 2TPP is, of course, open at the instant that relay 2TPP is energized by the discharge of the capacitor since back contact *c* of relay 2TP is necessarily open. This direct shunt circuit similarly assures that capacitor 2C1 will be completely discharged at the end of each code pulse cycle. The capacitor-resistor network, of course, provides some slow release period for the relay during the discharge time but relay 2TPP does release at the end of each received pulse cycle. Resistors 2R3 and 2R1 may be made adjustable or at least their values varied in order to obtain the desired timing for the sequential operation at the repeater location. It may be noted that the use of this decoding arrangement to control relay 2TPP prevents the pickup of this relay if relay 2TR is held steadily energized by energy falsely induced in the rails from an external source, which feature provides additional safety to the operation.

The track circuit connections or network at each repeater location include only one circuit path for connecting the track relay across the rails. Referring particularly to location 2, the winding of relay 2TR is connected across the rails only when back contact *c* of relay 2TPP is closed. It is to be noted that the flow of track current must be from the upper rail, as shown, through the relay winding returning to the lower rail in order to satisfy the requirements of the current direction arrow shown within the relay winding. Recalling that at location 1 the positive terminal of track battery 1TB, during the transmitting period of the sequence, is connected to the upper rail of the track, it is obvious that relay 2TR is properly connected to respond to pulses of energy in the rails transmitted from location 1. As will be discussed shortly, an equivalent battery connection at location 3 also provides pulses to which relay 2TR can respond. A track battery 2TB at location 2 is connected across the rails when front contact *d* of relay 2TP and front contact *c* of relay 2TPP are simultaneously closed, the positive terminal of this battery being connected through an adjustable track resistor to the lower rail, as shown. Obviously, even in case of a circuit fault, relay 2TR cannot respond to this polarity of track energy pulses. Referring briefly to location 1, it is obvious that pulses from location 2, since a positive polarity is connected to the lower rail, will provide the proper current flow for relay RTR to respond to these pulses.

A shunt is connected across the rails at location 2 when front contact *c* of relay 2TPP is still closed but relay 2TP has released to close its back contact *d*. Thus, the rail connection sequence at each repeater location provides a connection of the track relay across the rails followed by the connection of the track battery to the rails to transmit a pulse, and finally the connection of a direct shunt across the rails. Since track current pulses are normally being received at a repeater location from one direction or the other, except when a train shunt actually interrupts the flow, the transmitter arrangement and the connection sequence of the track circuit network are normally active.

It has already been established that the track circuit connections at location 1 and location 2 are such that the polarities of the track energy pulses supplied are opposite. Actually, this alternate arrangement is continued from one end of the stretch to the other. Specifically, it may be noted from the drawings that the positive terminal of the corresponding track battery is connected to the upper rail at locations 1 and 3 during the particular period of the local operating sequence when a pulse is being transmitted. Conversely, at locations 2 and 4, the positive terminal of the corresponding track battery is connected during the transmitting period to the lower rail. As shown in the drawings, the polarity of the track relay connections at each location are opposite the battery connections. Thus, any track relay can only respond to track circuit energy pulses received from an adjacent location and will not respond to any pulses transmitted from its own location by the associated track battery. In other words, track relay 2TR at location 2 can only respond to track energy pulses transmitted from location 1 or location 3. This alternate connection of the track battery polarity to the rails is one of the features of our invention which permits the use of repeater locations without requiring insulated joints to separate the adjoining track sections. As will also become more apparent shortly, the rail shunt period which is also a feature is provided by the transmitting means during the operating sequence at each location immediately after that location has transmitted a rail pulse. Since the associated track relay thus cannot respond during this period to any track energy, the direction of the pulsing, either to the left or to the right through the stretch of track, is maintained once the direction in which the track circuit arrangement is active has been established.

OPERATIONAL DESCRIPTION

It is now assumed that the remote operator in charge of this stretch of tract transmits a request for a clear indication on signal LG at location 4 in order to authorize a train to move from right to left in the stretch of track. When the remote request is received and registered, relay LAS releases, closing its back contact to connect track relay LTR continuously and directly across the rails. The opening of the front contact of relay LAS interrupts all circuit paths by which track battery 4TB may be connected to the rails so that no energy pulses are subsequently transmitted from this location even though the counting relay chain may continue to operate for a short period. Since, as will become apparent later, location 4 was the only location transmitting track circuit pulses, relay 3TR at location 3 therefore remains released regardless of the particular instant of time of its operating sequence during which this action occurs. If a pulse is being transmitted from location 3 at this instant, relays 3TP and 3TPP shunt the rails immediately following the pulse, during the period when the location 2 transmitting means provides an energy pulse. Therefore, relay 3TR can receive no energy and as soon as relay 3TPP eventually releases, relay 3TR is connected directly across the rails. A similar action occurs at location 2 ending with relay 2TR connected across the rails and no pulses being received.

At location 1, for reasons which will develop later, relay RTR has been following code pulses received through section 1T and relay RTP is picked up to register or decode the reception of periodic pulses. Therefore, no energy has been available for the operation of the counting relay chain since back contact *a* of relay RTP has been open. With the interruption of the pulses received from location 2, relay RTR remains released. Relay RTP releases at the end of its slow release period and closes its back contact *a* to complete the energizing circuit for bus lead 5 and thus the counting chain since back contact *a* of relay RTR is already closed. The closing of back contact *c* of relay RTP prepares a circuit for the transmission of pulses from this location as controlled by the sequential operation of the counting chain. The opening of front contact and closing of the corresponding back contact b of relay RTP holds signal RG at stop or, in other words, inhibits the clearing of this signal.

The counting chain at location 1 now begins it operational cycle, as was previously described. This provides the sequence of periods to transmit pulses from track battery 1TB, to shunt the rails, and to connect relay RTR across the rails, the sequence being continuously repeated. Since no pulses are being received from location 2 during the relay connection period of the sequence, relay RTR, of course, remains released, there being no tract energy available for energizing this relay. When the first pulse from track battery 1TB reaches location 2 through the rails of section 1T, relay 2TR is energized and picks up since it is connected across the rails at this time. The pickup of relay 2TR actuates the sequential pickup of relays 2TP and 2TPP. Relay 2TPP, as previously described, picks up, of course, only when relay 2TR releases at the end of the first pulse from location 1. At this point in the location 1 sequence, the rails are shunted. Thus, the pulse transmitted from location 2, with relays 2TP and 2TPP both picked up, will not be effective at location 1 to energize the track relay even though the proper polarity exists for relay RTR. However, the pulse from location 2 does flow through the rails of section 2T and is of the proper polarity to energize relay 3TR at location 3. This action occurs since relay 3TR is connected across the rails over back contact c of relay 3TPP.

This pickup of relay 3TR actuates a similar sequence at location 3. Again, relay 3TPP picks up only when relay 3TR releases at the end of a pulse being transmitted from location 2. Since relays 2TP and 2TPP are at this instant in positions to shunt the rails at location 2, relay 2TR is not energized even though the polarity of the pulse from location 3 is proper. This pulse from location 3 also flows through track section 3T and is of the proper polarity to energize relay LTR at location 4, which is connected directly across the rails over the back contact of relay LAS. The pickup and subsequent release of relay LTR, in response to this and later pulses from location 3, energizes relay LTP to decode this operation. Whether or not relay LTP picks up at the end of the first pulse received or after more than one pulse following operation of relay LTR is immaterial as long as it is a relatively short time. The pickup and holding of relay LTP by the decoding action registers a nonoccupied condition of the track stretch. Said in another way, when relay LTP picks up and holds, it indicates that there is no train shunt anywhere within the track stretch including sections 1T, 2T, and 3T. The closing of front contact b of relay LTP enables the requested clearing of signal LG to authorize the train to enter the stretch to move from right to left as desired by the remote operator.

When the train accepts the signal indication and enters section 3T, it shunts the rails so that relay LTR no longer receives track energy pulses and remains released. Relay LTP shortly releases, at the end of its slow release period, to register an occupied condition for the stretch of track. This indiciation is transmitted to the remote control location, jointly in connection with relay RTP at location 1 which is also released at this time. The signal control system is so arranged that the entry of a train past a clear signal LG returns the signal to its stop indication and restores relay LAS to its energized or picked-up condition. These actions are conventional and well known and are not specifically shown here. The release of relays LTR and LTP supplies energy for the operation of the associated counting chain and these relays begin to operate through the described sequence. Pulses of energy from track battery 4TB are thus applied to the rails behind the train in section 3T. It is to be noted that each pulse occurs when relays 4CRA and 4CRC are simultaneously picked up to close their respective front contacts c. The transmitting period lasts for a half cycle of the code rate of transmitter 4CT and reoccurs every three cycles of the code rate.

Relays 2TR and 3TR each continue to follow the track energy pulses received from the adjacent location to their left, that is, in the direction of the train movement, until the train actually passes the corresponding location, shunting the rails in advance thereof. When this occurs at each repeater location, corresponding relays TP and TPP remain released to connect the associated track relay across the rails. For example, when the train clears location 3, that is, its rear end passes the rail connections, relay 3TR then receives pulses transmitted from location 4. The previously described sequential operation of relays 3TP and 3TPP is reactuated so that energy pulses are transmitted through the rails of section 2T behind the train as it leaves the repeater location. The same pulses are also transmitted through section 3T but the rail shunt period at location 4 prevents any reception of these pulses by track relay LTR. The timing of the pulse transmission at location 3 thus must not exceed the length of the shunt period at location 4. In other words, as shown, with three counting relays at location 4, the release period of relay 3TP must not be more than a cycle of the code rate of transmitter 4CT and preferably is a half cycle of the code. In addition, relay 3TPP must hold long enough that relay 2TP releases prior to the release of relay 3TPP to connect relay 3TR across the rails again. If pulses are being transmitted in the other direction, corresponding timing periods and relations must exist. Continuing, when the train clears location 2, relay 2TR follows the energy pulses transmitted from location 3, the sequence of transmitter operation is actuated, and pulses are transmitted through section 1T behind the train. As already indicated, the timing is such that relays 3TP and 3TPP hold the rail shunt at that location during the period these pulses being transmitted from location 2, that is, until the release of relay 2TP at that location.

The transmitter apparatus at location 1 continues to transmit pulses into the rails as the train approaches, even though they are shunted away from location 2. This transmission continues as the train passes location 1 and its rear end clears the insulated joints J at the end of the stretch. After the train clears, track energy pulses are both transmitted and received at location 1, the incoming pulses being the result of the sequential operation to transmit pulses at location 2, which is repeating the location further to the right along the stretch. When a pulse from location 2 is eventually received at location 1 during the period when relay RTR is connected to the rails, this latter relay picks up. This interrupts the energy for the counting relay chain, chain operation ceases, and the relays release. This occurs because the diode snubs will not hold a relay CR for more than a short period bridging the contact transfer time of the code transmitter CT. Under these circumstances, of course, relay 1CRD does not pick up to establish the pulse transmission period, i.e., the connection from battery 1TB. When relay RTR releases at the end of this pulse, relay RTP picks up in the usual manner and the location 1 apparatus then becomes a receiver only. In other words, the opening of back contact a of relay RTP further interrupts and holds open the connection to terminal B for supplying the counting chain. Since another pulse will be received from location 2 at the usual timing period, relay RTR operates frequently enough in response to the pulses to hold relay RTP picked up.

If we assume rather that the first pulse received from location 2 arrives just as relay 1CRD picks up, the two pulses occurring at the same time may be said to buck each other. Actually, the two track batteries 1TB and 2TB are in series and the pulses flow through the rail and battery circuits only. Relay RTR is not energized since it is not connected to the rails with back contact c of relay 1CRD open. Conversely, the pulse transmitted from location 1 also does not reach relay 2TR. The sequence of action of the counting chain relays at location 1 and of the transmitter means at location 2 continues. Since the action of relays 2TP and 2TPP is in accordance with the sequence of the counting chain at location 4, the next pulse is transmitted from location 2 and arrives at location 1 when relay RTR is connected to the rails at the end of the longer shunt period occurring under the control of the counting chain at that location. Relay RTR then picks and interrupts the operation of the associated counting chain. When relay RTP subsequently picks up, it connects relay RTR continuously to the rails over its front contact c and further interrupts the operation of the associated counting chain relays. Thus, with the circuits as shown, the transmitter apparatus at location 4 dominates the arrangement and the track circuit is normally set up with pulses flowing from right to left. In other words, normally pulses flowing in the long track circuit originate at location 4 and are repeated sequentially at locations 3 and 2 and are then received at location 1. Relay RTP then registers the unoccupied condition of the section and such indication may, over means not shown, be transmitted to the remote location to indicate the existing condition. It will be obvious that if signal RG is to be cleared as the result of a remotely received request, a similar but reverse operation of the apparatus occurs except that track circuit direction is already established. Since such may be followed by reference to the preceding description in connection with the accompanying drawings, the setup of the track circuit apparatus for clearing signal RG and the reset at the end of such operation after the passage of the train is not herein described.

The arrangement of our invention thus provides a track circuit for a long stretch of track without requiring insulated joints to separate the stretch into shorter sections. This track circuit detects the presence or absence of a train within the entire stretch and thus provides control for signals governing train entry. Each repeater location requires only a single track battery and is effective to transmit the track code pulses in either direction. This feature allows a reversible signal system for either direction of train movement. The track circuit sets up for the requested direction, provides control for the entry signal, and then resets after passage of the train. The apparatus is so arranged that pulse transmission in a selected direction dominates during at-rest conditions in the track circuit, that is, when no train is present, so that reset after the passage of the train is orderly and quick. The resulting track circuit arrangement is thus efficient in operation and economical in installation and maintenance.

Although we have herein shown and described but one specific track circuit arrangement embodying the features of our invention, it is to be understood that various modifications and changes may be made therein within the scope of the appended claims without departing from the spirit and scope of our invention.

Having thus described our invention, what we claim is:

1. In a signal system for a stretch of railroad track having electrically continuous rails and over which trains move in either direction, with an entry signal at each end to control the movement of a train into the stretch, a jointless track circuit arrangement for said stretch comprising in combination,
   a single source of track circuit energy at each end location and at each of a plurality of intermediate repeater locations,
   b. a receiver means at each location connected at times to the rails for receiving track circuit energy transmitted from an adjacent location,
   c. each end location receiver means responsive to the reception of pulses of track energy for registering an unoccupied condition of said stretch and coupled for enabling the associated signal to authorize the entry of a train into said stretch when an unoccupied condition is registered,
   d. an energy transmitter means at each end location coupled to the rails and operable for connecting in repeated sequences across said rails the associated source, a shunt connection, and the associated receiver means, and
   e. an energy transmitter means at each repeater location controlled by the associated receiver means in response to the reception of track energy pulses for producing a repeated sequence of rail connection conditions including in order the associated source, a shunt connection, and the associated receiver means,
   f. each end location receiver means having further connections for inhibiting the transmission of energy from that location and for maintaining the corresponding receiver means connected across said rails when an unoccupied condition is registered.

2. A track circuit arrangement as defined in claim 1 in which the receiver means at each end location comprises,
   a. a track relay having predetermined polarity characteristics connected at times to said rails during the connection sequence by the associated transmitter means in a manner for responding only to track energy pulses transmitted from an adjacent location and to be nonresponsive to pulses from the associated track energy source means, and
   b. a decoding means responsive to the pulse following operation of the associated track relay for registering a track stretch unoccupied indication when track energy pulses are continuously received,
1. each said decoding means coupled for both inhibiting sequential operation of the associated transmitter means and for enabling the clearing of the corresponding entry signal when an unoccupied indication is registered,
2. each decoding means also coupled for connecting the associated track relay continuously across the rails when an unoccupied indication is registered.

3. A track circuit arrangement as defined in claim 2 in which each end location transmitter means comprises,
   a. a plurality of counting chain relays interconnected for operating in predetermined sequence when supplied with periodic pulses of operating energy,
   b. a source of operating energy controlled by the corresponding decoding means for supplying operating energy to said counting chain relays only in the absence of an unoccupied stretch indication, and
   c. a pulsing means connected for periodically pulsing the energy supplied from said operating energy source for driving the said chain relays through said predetermined sequence,
   d. a preselected two of said chain relays controlling the repeated sequence of connections across said rails when the relay chain is sequentially operating.

4. A track circuit arrangement as defined in claim 1 in which,
   a. the receiver means at each repeater location comprises a track relay having a predetermined polarity characteristic and connected at times across said continuous rails for responding only to energy pulses transmitted from either adjacent location,
   b. the transmitter means at each repeater location comprises a first and a second track repeater relay,
   c. each first repeater relay connected for repeating each response of the associated track relay to the initial reception of a track energy pulse,
      1. each first relay holding in its active repeating position for a predetermined interval after a track pulse terminates,
   d. each second repeater relay coupled for repeating each response by the associated track relay to the termination of a received track energy pulse, only if the corresponding first relay is repeating the initial response,
      1. each second relay holding in its active repeating position until after the corresponding first relay returns to its nonactive position, and releasing prior to the next track energy pulse,
   e. said second relay in its nonactive position connecting the associated track relay across said rails,
   f. both repeater relays in the active repeating position jointly connecting the corresponding single track energy source across said rails, and
   g. said repeater relays controlling the connection of a shunt circuit across said rails when said first relay is in its nonactive position and said second relay is in its repeating position.

5. A track circuit arrangement as defined in claim 3 in which,
   a. the receiver means at each repeater location is a track relay connected at times across said continuous rails, normally occupying a first position and operable to a second position in response only to the reception of a track energy pulse from either adjacent location,
   b. the transmitter means at each repeater location comprises a first and a second repeater relay, each normally in a first position and operable at times to a second position,
   c. said first relay at each repeater location controlled by the associated track relay in its second position for operating to its second position to repeat the reception of each track energy pulse from an adjacent location,
      1. said first relay having slow release characteristics for holding in its second position a predetermined interval after said associated track relay returns to its first position at the termination of the received pulse,
   d. said second relay at each repeater location controlled jointly by the associated track relay and first relay for operating to its second position in response to the return of said associated track relay to its first position upon termination of the received pulse, only if said associated first relay is operated to its second position,
      1. said second relay also having a predetermined slow release period to hold in its second position until after said first relay returns to its first position,
   e. said associated track relay being connected across said rails by a first position contact of said second relay,
   f. the corresponding track energy source being connected across said rails by second position contacts in series of said first and second relays, and
   g. said rail shunt connection at each repeater location including a first position contact of the corresponding first relay and a second position contact of the corresponding second relay.

6. A track circuit arrangement as defined in claim 3 in which,
   a. the plurality of chain relays at one end location is a preselected smaller number than the plurality of chain relays at the other end location,
      1. the shorter relay chain transmitting track energy pulses at shorter intervals than from said other end location,
   b. the track relay at said other end location being responsive to the reception of the first of the shorter interval track energy pulses for interrupting the supply of operating energy to the associated chain relays,
   c. the decoding relay at said other end location responsive to the registration of the unoccupied stretch indication resulting from the reception of the shorter interval pulses for maintaining said interruption of the associated relay chain operating energy as long as reception of the shorter interval pulses continues, whereby the transmitter means including the shorter relay chain dominates the transmission of track energy pulses when the stretch is unoccupied.

7. A track circuit arrangement as defined in claim 6 which further includes,
   a. a stick relay at each end location normally occupying a first position and responsive to the registry of a clear entry signal request for operating to a second position, b. each stick relay coupled for enabling the sequence of rail connections at that location when in its first position and for interrupting said sequence and connecting the associated track relay continuously to the rails when in its second position, c. each end location transmitter means responsive to the continued absence of received energy pulses for initiating the sequence of rail connections at the corresponding location if not already active.

8. A jointless track circuit arrangement, for a stretch of track having electrically continuous rails and occupied at times by trains moving in either direction, comprising in combination, a. a single source of track circuit energy at each end location of said stretch and at each of a plurality of intermediate repeater locations, b. a track energy receiver means at each end location at times connected for receiving energy being transmitted through said rails,
  1. each end location receiver means being selectively responsive only to coded track energy transmitted from the adjacent repeater location for registering the nonoccupied condition of said stretch, c. a transmitter means at each end location controlled in part by the associated receiver means and operable for repeatedly producing a predetermined sequence of rail connection conditions in the absence of a nonoccupied condition registration,
  1. each end location transmitter means coupled for connecting across the rails in said preselected sequence the associated receiver means, the associated source, and a rail shunt circuit, d. a track energy receiver means at each repeater location at times connected to said rails and selectively responsive only to coded track energy transmitted from either adjacent location, and e. a transmitter means at each repeater location controlled by the associated receiver means when responding to coded track energy for developing in repeated sequences an energy receiving period, an energy transmitting period, and a rail shunt circuit connection,
  1. each repeater location transmitter means also coupled for connecting to said rails the associated receiver means during said receiving period and the associated source during said transmitting period.

9. A track circuit arrangement as defined in claim 8 in which each end location receiver means comprises, a. a track relay having predetermined polarity characteristics and connected at times to the rails during the connection sequence by the associated transmitter means for responding only to coded energy transmitted from the adjacent repeater location, and b. a decoding relay means controlled by the associated track relay and responsive to the code following operation of that track relay for registering a nonoccupied condition of said stretch, c. each decoding relay means also coupled for interrupting the rail connections sequence and connecting said associated track relay continuously across the rails when a nonoccupied condition is registered.

10. A track circuit arrangement as defined in claim 9 in which each end location transmitter means comprises, a. a plurality of counting chain relays interconnected for operating in a predetermined repeatable sequence when supplied with operating energy having a preselected pulse pattern, b. a source of operating energy controlled by the corresponding decoding relay means for supplying operating energy for the corresponding chain relays only in the absence of a nonoccupied condition registration, c. a coding means coupled for supplying energy having said preselected pulse pattern to the corresponding chain relays from the associated operating energy source, d. a circuit network connected to said rails and controlled by a preselected two of the plurality of corresponding chain relays for connecting across said rails in said predetermined sequence the associated track relay, the associated track energy source, and said rail shunt circuit.

11. A track circuit arrangement as defined in claim 10 in which, a. the track energy receiver means at each repeater location is a track relay having predetermined polarity characteristics, normally occupying a first position, and operable to a second position, when selectively connected across said continuous rails, in response only to the reception of a track energy pulse from either adjacent location, b. the transmitter means at each repeater location comprises,
  1. a pair of repeater relays, each normally in a first position and operable to a second position, and
  2. a circuit network connected across said rails and including contacts of the corresponding repeater relays and the winding of the associated track relay, c. each pair of repeater relays controlled by the associated track relay for operating in a predetermined sequence between said first and second positions each time said associated track relay responds to the reception and termination of a track energy pulse, and d. each circuit network controlled by the included repeater relay contacts during an operational sequence for connecting across the rails in sequence the associated track relay winding, the associated track energy source, and a rail shunt circuit path.

12. A track circuit arrangement as defined in claim 11 in which, a. the polarity of the rail connections of the track energy source at each location is of opposite polarity to the rail connections of the corresponding track energy source at each adjacent location, and b. the track relay at each location is connected to the rails with its predetermined polarity characteristics opposite to the polarity of the track energy source rail connections at the same location, whereby a track relay is responsive only to energy transmitted from an adjacent location and nonresponsive to energy transmitted from its own location.

13. A track circuit arrangement as defined in claim 12 in which, a. the counting chain at one end location includes four counting relays,
b. the counting chain at the other end location includes three counting relays, and
c. the coding means at each end location has the same pulse rate, whereby the predetermined operating sequence at said other end is of shorter duration, the other end track energy source is rail connected more frequently to transmit track energy pulses, and the other end transmitter means becomes the dominant pulse transmitter when said stretch is nonoccupied and the one end track relay is held continuously connected across said rails.

* * * * *